United States Patent [19]  [11]  4,375,305
Teramachi  [45] * Mar. 1, 1983

[54] CIRCULATING TYPE BALL SPLINE BEARING

[76] Inventor: Hiroshi Teramachi, 2-34-8,, Higashi-Tamagawa, Setagaya-ku, Tokyo, Japan

[*] Notice: The portion of the term of this patent subsequent to Jan. 5, 1999, has been disclaimed.

[21] Appl. No.: 228,096

[22] Filed: Jan. 26, 1981

[30] Foreign Application Priority Data

Feb. 25, 1980 [JP] Japan ............................ 55-021619

[51] Int. Cl.$^3$ ............................................. F16C 29/06
[52] U.S. Cl. ........................................................ 308/6 C
[58] Field of Search ..................... 308/6 C; 64/23.7; 464/168

[56] References Cited
U.S. PATENT DOCUMENTS 3,808,839 5/1974 Teramachi .................. 308/6 C X
3,973,809 8/1976 Breteler et al. ................ 308/6 C
4,139,242 2/1979 Ernst et al. .................... 308/6 C
4,206,951 6/1980 Ernst et al. .................... 308/6 C
4,309,061 1/1982 Teramachi ..................... 308/6 C

FOREIGN PATENT DOCUMENTS 2017991 10/1971 Fed. Rep. of Germany ...... 308/6 C

Primary Examiner—Stuart S. Levy
Assistant Examiner—Daniel P. Stodola
Attorney, Agent, or Firm—George B. Oujevolk

[57] ABSTRACT

A circulating type ball spline bearing is characterized by: U-shaped channels formed axially on the inner periphery of the outer sleeve and each having a pair of concave raceways substantially of the same curvature as the ball bearings on and along opposite side walls thereof; non-load carrying ball grooves formed axially on the inner periphery of the outer sleeve at a predetermined distance from the U-shaped channels such that the balls in the non-load carrying grooves have a small contact angle close to the torque direction; U-shaped turn grooves formed on the inner periphery of the outer sleeve continuously to the concave raceways and non-load carrying ball grooves for turning the direction of circulating balls; U-shaped turn grooves formed in each one of the end lids fixedly fitted on the opposite ends of the outer sleeve for reversing the direction of load carrying or non-load carrying balls; and a number of slits formed in the retainer in projected wall portions in engagement with the U-shaped channels of the outer sleeve in face-to-face relation with the concave raceways, each one of the slits having a curved guide tongue at the opposite ends thereof to cover the open ends of the non-load carrying ball grooves; the raceways constituted by the outer sleeve, end lids and retainer being filled with the ball bearings.

1 Claim, 7 Drawing Figures

CIRCULATING TYPE BALL SPLINE BEARING

BACKGROUND OF THE INVENTION

1. Field of the Invention

This invention relates to a circulating type ball spline bearing employing a cylindrical race body which has both load carrying ball raceways in U-shaped channels and non-load carrying ball grooves radially cut into its inner periphery in such a manner that a contact angle on an extension line connecting a load carrying ball with a non-load carrying ball lies as close to the torque direction as possible.

In the circulating type ball spline bearing, the balls which are accommodated in the outer sleeve or race body of the bearing are engaged with and put in smooth rolling motions in guide tracks of the spline shaft, permitting torque transmission and ensuring light and smooth movements even in a preloaded state without frictional wear of sliding parts. Therefore, it is suitable for application to those machines which requires high positioning accuracy as well as repeated accuracy and rigidity, for example, machining centers, X-Y-Z guides of various NC machine tools, electric discharge machines, high speed presses, high precision press ram guides, press die exchangers and a diversity of weight transfer mechanisms.

2. Description of Prior Art

As indicated by imaginary lines a and b in FIG. 2, the conventional ball spline bearing has the non-load carrying ball groove b located on the extension of a line which connects the center of the outer sleeve with the center of a load carrying ball so that it has to be formed in a large diameter a, requiring a high material cost and imposing restrictions on the design of the machine on which the bearing is to be used. In addition, it is subjected to great inertial force during rotation of the ball spline, giving rise to problems with regard to the strength of the shaft itself.

In an attempt to eliminate the above-mentioned drawbacks or problems, the present inventor developed prior to this invention a circulating type ball spline bearing which has the non-load carrying ball grooves formed in the outer sleeve at a position on the extension of a line connecting a load carrying ball with a R-groove of the spline shaft and a line connecting the load carrying ball with the non-load carrying ball to have its contact angle as close to the torque direction as possible, thereby increasing the torque transmission.

However, it has been found extremely difficult to form a plural number of non-load carrying grooves through the outer sleeve by boring operation due to its limited thickness, the efficiency of the boring operation being often impaired by abrasion or damage of drills or other tools.

SUMMARY OF THE INVENTION

With the foregoing in view, the present invention has as its object the provision of a circulating type ball spline bearing employing an outer sleeve which has U-shaped channels with raceways for load carrying ball grooves and non-load carrying ball grooves radially cut into the inner periphery thereof respectively or simultaneously by a broaching or slotting operation, thereby permitting to enhance the efficiency of the grooving operation to a considerable degree.

According to the present invention, there is provided a circulating type ball spline bearing including an outer sleeve, opposite end lids, a retainer and ball bearing, the bearing being characterized by: U-shaped channels formed axially on the inner periphery of the outer sleeve and each having a pair of concave raceways substantially of the same curvature as the ball bearings on and along opposite side walls thereof; non-load carrying ball grooves formed axially on the inner periphery of the outer sleeve at a predetermined distance from the U-shaped channels such that the balls in the non-load carrying grooves have a small contact angle close to the torque direction; U-shaped turn grooves formed on the inner periphery of the outer sleeve continuously to the concave raceways and non-load carrying ball grooves for turning the direction of circulating balls; U-shaped turn grooves formed in each one of the end lids fixedly fitted on the opposite ends of the outer sleeve for reversing the direction of load carrying or non-load carrying balls; and a number of slits formed in the retainer in projected wall portions in engagement with the U-shaped channels of the outer sleeve in face-to-face relation with the concave raceways, each one of the slits having a curved guide tongue at the opposite ends thereof to cover the open ends of the non-load carrying ball grooves; the raceways constituted by the outer sleeve, end lids and retainer being filled with the ball bearings.

DESCRIPTION OF PREFERRED EMBODIMENT

Figure 1:
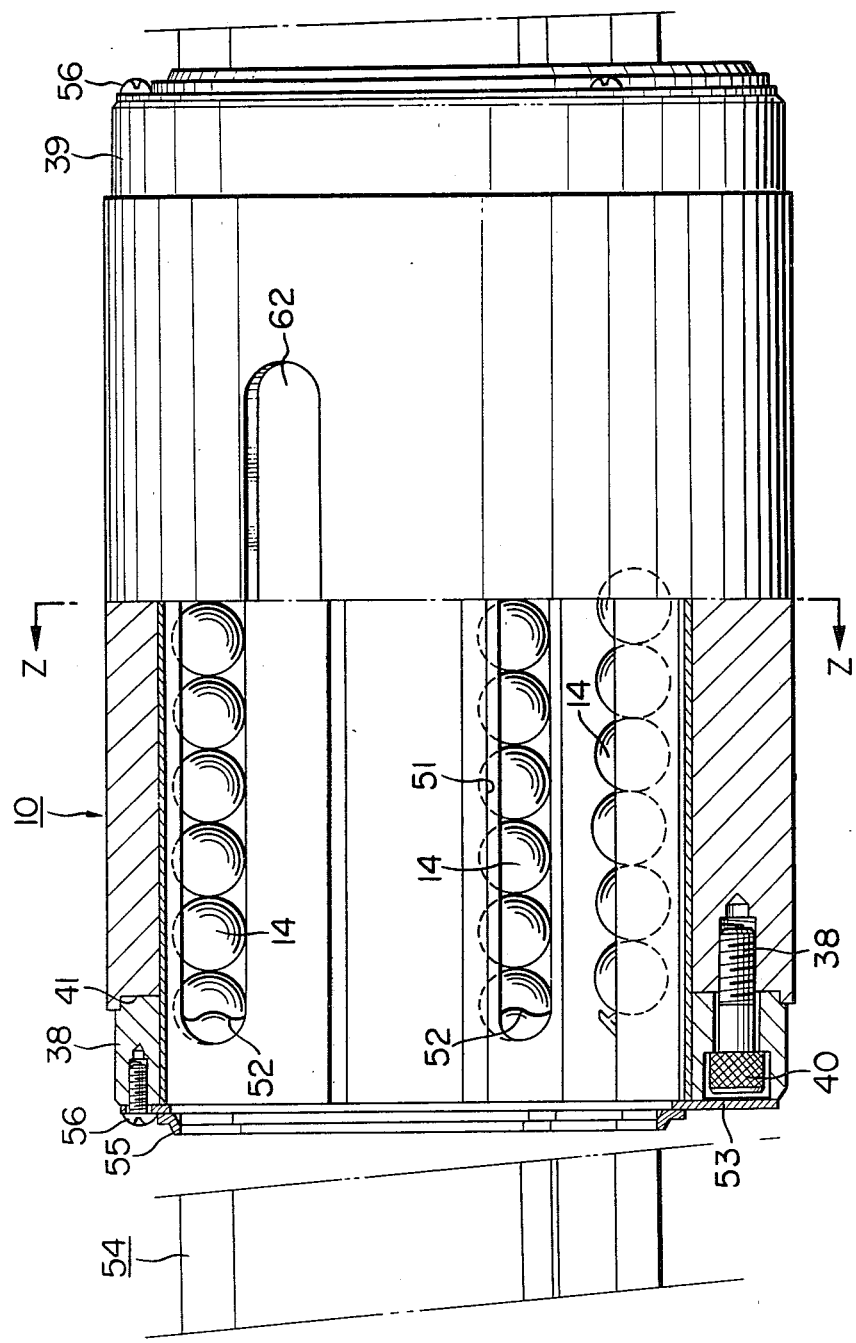
FIG. 1 is a half-sectioned side view of a circulating type ball spline bearing according to the present invention.
Figure 2:
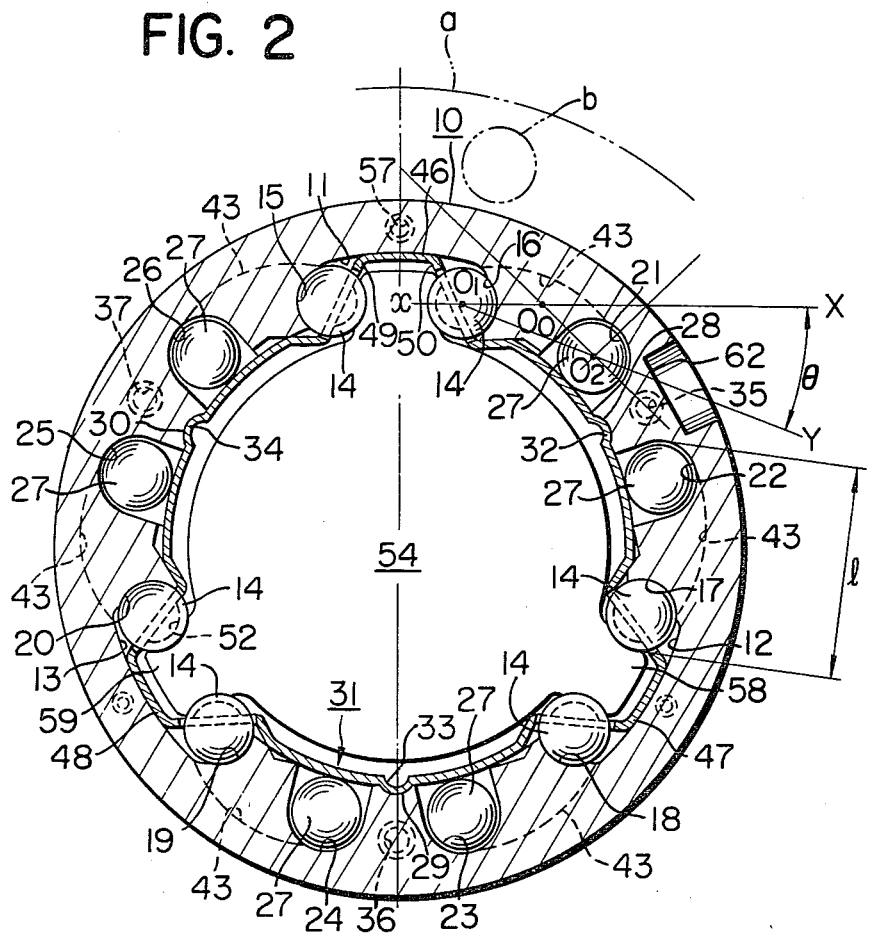
FIG. 2 is a cross section taken on line Z—Z of FIG. 1.
Figure 3:
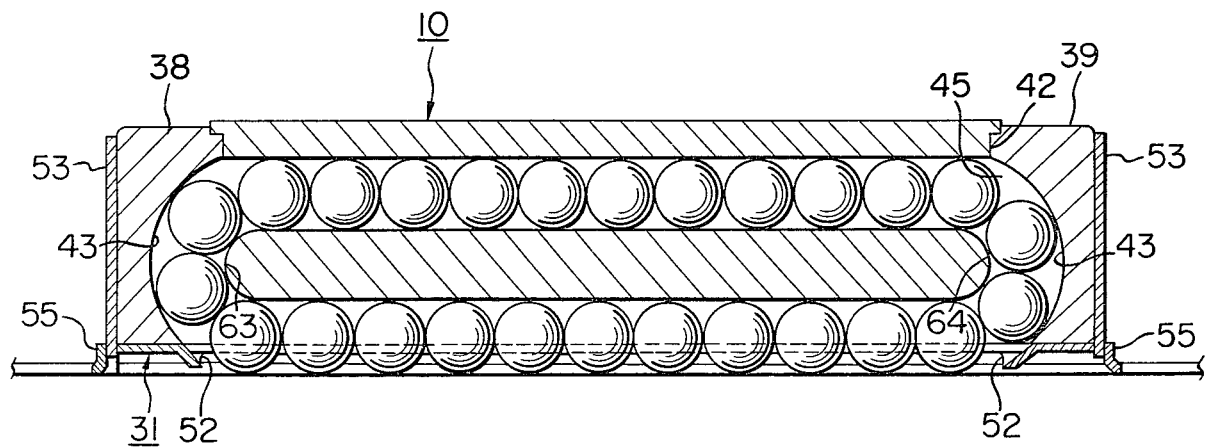
FIG. 3 is a sectional view taken on line $X\text{-}O_1\text{-}O_0\text{-}O\text{-}_2\text{-}X^1$ of FIG. 2.
Figure 4:
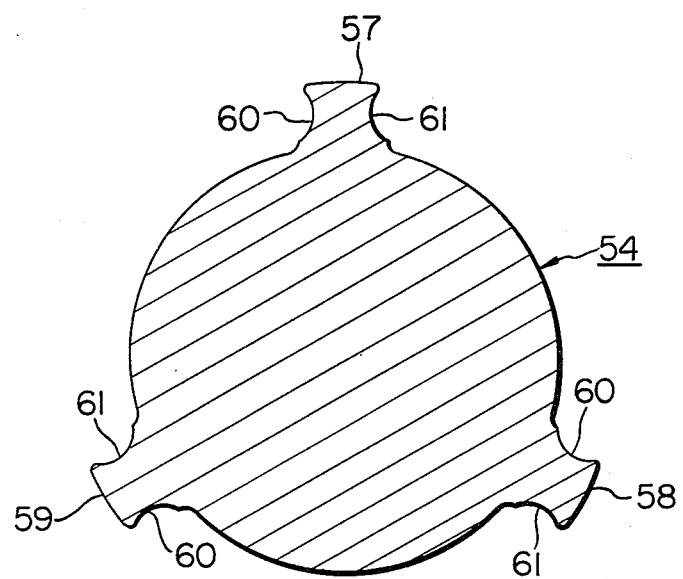
FIG. 4 is a cross section of the spline shaft.
Figure 5:
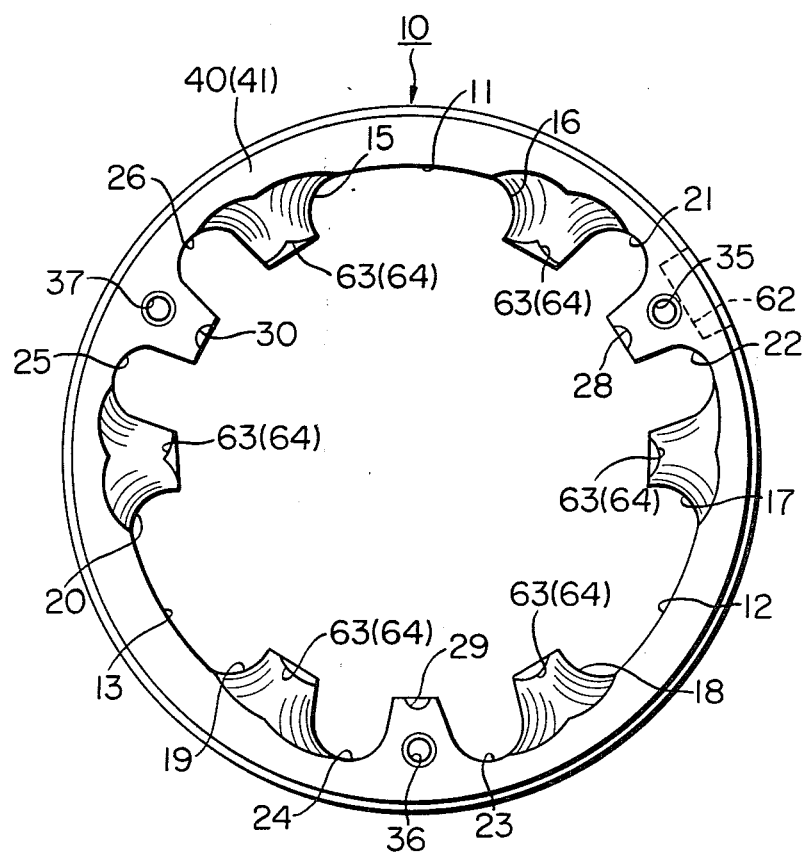
FIG. 5 is a side view of the outer sleeve.
Figure 6A:
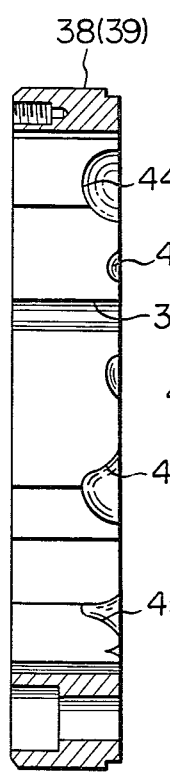
FIG. 6(a) is a side view of an end lid.
Figure 6B:
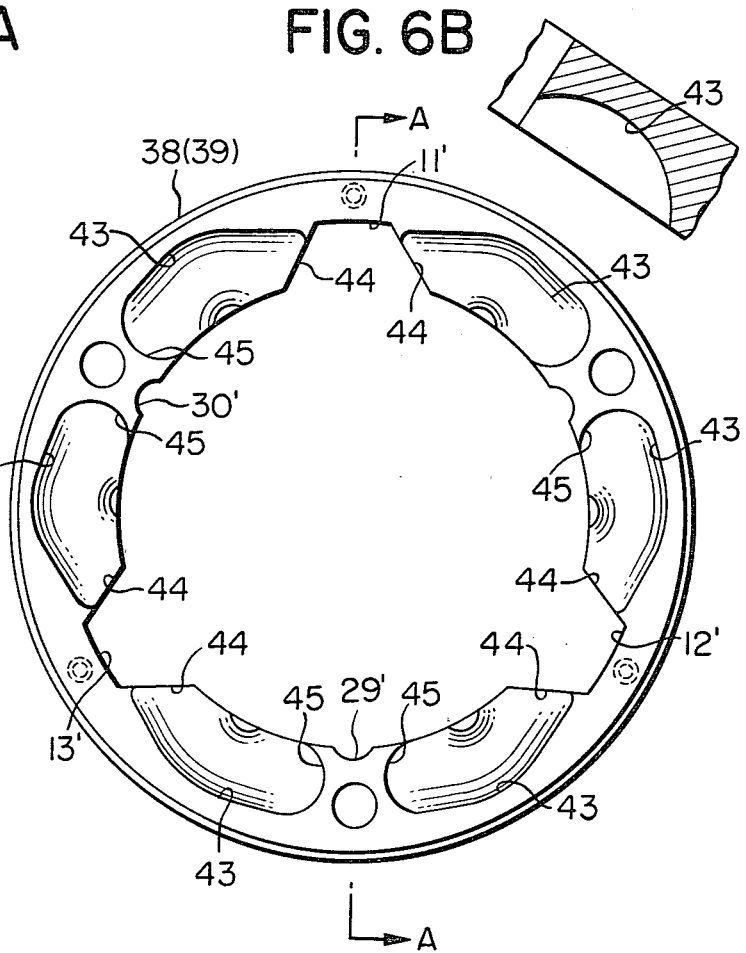
FIG. 6(b) is a sectional view taken on line A—A of FIG. 6(a).

Referring now to the accompanying drawings, designated generally at 10 is an outer sleeve which is obtained by cutting a thick cylindrical pipe into predetermined dimensions or by boring a center hole in a rod material, the outer sleeve 10 with a relatively large wall thickness being formed with U-shaped channels 11 to 13 for the load carrying balls axially on its inner periphery by a broaching or slotting operation.

The U-shaped channels 11 to 13 are each provided with concave raceways 15 to 20 substantially of the same curvature as the load carrying balls 14. The raceways 15 to 20 are formed by a ball burnishing or grooving operation.

Indicated at 21 to 26 are non-load carrying ball grooves which are formed on the inner periphery of the sleeve 10 symmetrically on opposite sides of the load carrying ball raceways 15 to 20 with a contact angle lying as close to the torque direction $O_1\text{-}O_2\text{-}Y$ as possible and at a position spaced from the latter by a suitable distance l which is necessary for the circulating balls to make turns to or from the non-load carrying ball grooves. The non-load carrying ball grooves 21 to 26 are formed by a broach independently or, more economically, simultaneously with the broaching operation for the U-shaped channels 11 to 13.

The outer sleeve 10 which has the above-described non-load carrying ball grooves 21 to 26 and load carrying ball raceways 15 to 20 are provided with U-shaped turn grooves 63, 64 on opposite end faces for turning the direction of the circulating balls.

The reference numerals 28 to 30 denote longitudinal R-grooves which are formed on the inner periphery of the outer sleeve 10 for blocking rotation of a retainer 31. The R-grooves 28 to 30 are formed on the inner periphery of the outer sleeve 10 in opposing relation with the U-shaped channels 11 to 13 and fitted on round longitudinal ribs 32 to 34 on the outer periphery of the retainer 31.

The outer sleeve 10 is provided with tapped holes 35 to 37 on its opposite end faces 41 and 42 for engagement with hexagon socket head bolts 40 which secure end lids 38 and 39 to the opposite end faces of the outer sleeve 10.

The end lids 38 and 39 which are formed of a steel material or by die casting or injection molding have three U-shaped channels 11', 12' and 13' on the inner periphery for load carrying balls similar to the outer sleeve 10, and six U-shaped turn grooves 43. These U-shaped turn grooves switch switch the direction of the circulating balls from a load carrying ball raceway to a non-load carrying ball groove of the outer sleeve 10 or vice versa. The U-shaped turn grooves 43 have opposite open guide ends 44 and 45 continuously connected to the opposing ends of one of the non-load carrying ball grooves 21 to 26 and one of the load carrying ball raceways 15 to 20 of the outer sleeve 10.

The reference numerals 28' to 30' indicate R-grooves which are formed on the inner peripheries of the end lids 38 and 39 in axial alignment with the R-grooves 28 to 30 of the outer sleeve 10 for blocking rotation of the retainer.

The retainer 31 is fabricated from a thin tubular steel sheet, forming by press-forming and bulging operations the trapezoidal ridges 46 to 48, round-topped longitudinal ribs 32 to 34 and curved wall portions which fit on the inner periphery of the outer sleeve 10.

The trapezoidal ridges 46 to 48 have a pair of slits (windows) 51 in outwardly converging side walls 49 and 50 in face-to-face relation with the loaded ball guide surfaces 15 to 20. Each slit 51 is provided integrally at its opposite ends with guide tongues 52 which are curved to scoop up or out the circulated load carrying balls successively.

After press-forming, the retainer 31 is subjected to a Toughtride treatment for the purpose of increasing its surface hardness and rigidity.

Indicated at 53 are retainer holders of a steel material each with a center aperture which is so shaped as to leave a small clearance around the spline shaft 54 and which has a rubber seal 55 heat-mounted around the marginal edges thereof. The retainer holders 53 are fixed at a predetermined position on the end lids 38 and 39 by screws 56.

The reference numeral 54 denotes a spline shaft of a steel material which is provided with three or more axial ridges 57 to 59 at spaced positions around its circumference. The axial ridges 57 to 59 are each formed on its opposite sides with ball guide tracks 60 and 61 substantially of the same curvature as the load carrying balls 14. Indicated at 62 is a key way which is formed on the outer periphery of the sleeve 10.

The circulating type ball spline bearing of the present invention which is constituted by the outer sleeve 10, end lids 38 and 39, retainer 31 and balls 14 are assembled in the following order.

After attaching an end lid to one end face of the outer sleeve, the retainer is inserted into the sleeve and the balls are filled into the non-load carrying ball grooves and the raceways between the load carrying ball guide surfaces of the sleeve and the slits of the retainer. Thereafter, the other end lid and the retainer holder with the rubber seal are fixed in position to complete the assembling work.

The circulating type ball spline bearing mounted on a spline shaft has a reduced outer diameter since the extension line $O_1$-$O_2$-Y through the centers of the load carrying and non-load carrying balls lies closer to the torque direction.

In addition, the non-load carrying ball grooves can be formed simultaneously with the U-shaped raceways for the load carrying balls by broaching or slotting operation so that it is possible to shorten the time of machining operation to a considerable degree as compared with the conventional boring operations.

The provision of the non-load carrying ball grooves in the direction of the contact angle ensures smooth circulation of the balls and allows the bearing in a compact construction with a reduced outer diameter.

Further, there is another advantage that the influence of centrifugal force during high speed operation is reduced since the distance between the non-load carrying and load carrying balls is made smaller.

Although one preferred embodiment of the present invention has been described and shown, it is to be understood that the invention is not limited to the particular details shown and includes all the alterations and modifications as encompassed by the appended claims.

What is claimed is:

1. A circulating type ball spline bearing including an outer sleeve, opposite end lids, a retainer and ball bearings, characterized in that said bearing comprises:

U-shaped channels formed axially on the inner periphery of said outer sleeve and each having a pair of concave raceways substantially of the same curvature as the ball bearings on and along opposite side walls thereof;

non-load carrying ball grooves formed axially on the inner periphery of said outer sleeve at a predetermined distance from said U-shaped channels such that the balls in said non-load carrying ball grooves have a small contact angle lying close to the torque direction;

U-shaped turn grooves formed on the inner periphery of said outer sleeve continuously to said concave raceways and non-load carrying ball grooves for turning the direction of circulating balls;

U-shaped turn grooves formed in each one of said end lids fixedly fitted on the opposite end faces of said outer sleeve for reversing the direction of load carrying or non-load carrying balls; and a number of slits formed in said retainer in projected wall portions in engagement with said U-shaped channels of said outer sleeve in face-to-face relation with said concave raceways, each one of said slits having a curved guide tongue at the opposite ends thereof to cover the open ends of said non-load carrying ball grooves;

the raceways constituted by said outer sleeve, end lids and retainer being filled with said ball bearings.

* * * * *